(12) United States Patent
El Khayat et al.

(10) Patent No.: US 9,843,456 B2
(45) Date of Patent: Dec. 12, 2017

(54) FEEDBACK BASED ADAPTATION OF MULTICAST TRANSMISSION OFFSET

(71) Applicant: Telefonaktiebolaget LM Ericsson (publ), Stockholm (SE)

(72) Inventors: Ibtissam El Khayat, Glons (BE); Prabaharan Kanesalingam, Ottawa (CA); Jie Ling, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 24 days.

(21) Appl. No.: 15/100,753

(22) PCT Filed: Dec. 16, 2013

(86) PCT No.: PCT/EP2013/076756
§ 371 (c)(1),
(2) Date: Jun. 1, 2016

(87) PCT Pub. No.: WO2015/090355
PCT Pub. Date: Jun. 25, 2015

(65) Prior Publication Data
US 2016/0373267 A1    Dec. 22, 2016

(51) Int. Cl.
*H04W 4/00*    (2009.01)
*H04L 12/18*    (2006.01)
(Continued)

(52) U.S. Cl.
CPC ........ *H04L 12/1881* (2013.01); *H04L 12/189* (2013.01); *H04W 4/06* (2013.01); *H04W 68/10* (2013.01); *H04W 88/08* (2013.01)

(58) Field of Classification Search
None
See application file for complete search history.

(56) References Cited

U.S. PATENT DOCUMENTS 5,930,248 A * 7/1999 Langlet ............... H04B 7/0691
370/347
7,042,858 B1 * 5/2006 Ma ........................ H04L 1/0618
370/208
(Continued)

OTHER PUBLICATIONS

3rd Generation Partnership Project, "3rd Generation Partnership Project; Technical Specification Group Radio Access Network; MBMS synchronisation protocol (SYNC) (Release 11)", Technical Specification, 3GPP TS 25.446 V11.0.0, Sep. 1, 2012, pp. 1-22, 3GPP, France.
(Continued)

*Primary Examiner* — Bob Phunkulh
(74) *Attorney, Agent, or Firm* — Coats & Bennett, PLLC (57) ABSTRACT

A node (260) of a cellular network node sends data units to a group of base stations (200). Each data unit is configured for conveying multicast data to be sent by the base stations (200) in a synchronized manner at a starting time indicated in the data unit. For each of the data units, the node (260) determines the starting time as the sum of the time of sending the data unit from the node and an offset value. Further, the node (260) obtains feedback information from the base stations (200) of the group. The feedback information indicates a deviation of the starting time indicated in one of the data units (411) from an earliest possible time of sending the multicast data from the data unit (411) by the base stations (200) of the group. Depending on the feedback information, the node (260) adapts the offset value.

23 Claims, 9 Drawing Sheets

(51) Int. Cl.
*H04W 4/06* (2009.01)
*H04W 68/10* (2009.01)
*H04W 88/08* (2009.01)

(56) References Cited

U.S. PATENT DOCUMENTS

| | | | |
|---|---|---|---|
| 7,307,971 | B2 | 12/2007 | Park et al. |
| 2008/0240097 | A1 | 10/2008 | Kim et al. |
| 2009/0080406 | A1 | 3/2009 | Gopal et al. |
| 2011/0249619 | A1* | 10/2011 | Yu .................. H04B 7/024 370/328 |
| 2012/0176996 | A1* | 7/2012 | Kim ................ H04W 72/0413 370/329 |
| 2013/0267222 | A1* | 10/2013 | Park ................ H04B 7/0619 455/422.1 |
| 2013/0294271 | A1* | 11/2013 | Nagata .............. H04W 24/10 370/252 |
| 2015/0071260 | A1* | 3/2015 | Chun ................ H04L 1/1848 370/336 |
| 2015/0117355 | A1* | 4/2015 | Kim ................ H04B 7/024 370/329 |
| 2015/0139112 | A1* | 5/2015 | Park ................ H04B 7/0413 370/329 |
| 2015/0163687 | A1* | 6/2015 | Lee ................. H04W 24/10 370/252 |
| 2015/0172024 | A1* | 6/2015 | Kim ................ H04B 7/024 370/329 |
| 2015/0327246 | A1* | 11/2015 | Kim ................ H04L 5/0057 370/329 |
| 2015/0351059 | A1* | 12/2015 | Seo ................. H04W 56/002 370/350 |
| 2015/0372732 | A1* | 12/2015 | Kim ................ H04B 7/04 375/267 |
| 2016/0029305 | A1* | 1/2016 | Kim ................ H04W 24/02 370/311 |

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, 3GPP TS 36.300 V11.6.0, Jun. 1, 2013, pp. 1-209, 3GPP, France.

3rd Generation Partnership Project, "3rd Generation Partnership Project; Technical Specification Group Core Network and Terminals; Interworking between the Public Land Mobile Network (PLMN) supporting packet based services and Packet Data Networks (PDN) (Release 12)", Technical Specification, 3GPP TS 29.061 V12.2.0, Jun. 1, 2013, pp. 1-163, 3GPP, France.

3rd Generation Partnership Project, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)", Technical Specification, 3GPP TS 29.274 V11.7.0, Jun. 1, 2013, pp. 1-228, 3GPP, France.

3rd Generation Partnership Project, "3rd Generation Partnership Project; Technical Specification Group Radio Access Network; Evolved Universal Terrestrial Radio Access Network (E-UTRAN); M3 Application Protocol (M3AP) (Release 11)", Technical Specification, 3GPP TS 36.444 V11.6.0, Jun. 1, 2013, pp. 1-63, 3GPP, France.

3rd Generation Partnership Project, 3rd Generation Partnership Project; Technical Specification Group Services and System Aspects; Multimedia Broadcast/Multicast Service (MBMS); Architecture and functional description (Release 11), Technical Specification, 3GPP TS 23.246 V11.1.0, Mar. 1, 2012, pp. 1-66, 3GPP, France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, 3GPP TS 36.300 V11.7.0, Sep. 1, 2013, pp. 1-209, 3GPP, France.

3rd Generation Partnership Project, "3rd Generation Partnership Project; Technical Specification Group Radio Access Network; Evolved Universal Terrestrial Radio Access Network (E-UTRAN); M1 data transport (Release 11)", Technical Specification, 3GPP TS 36.445 V11.0.0, Sep. 1, 2012, pp. 1-8, 3GPP, France.

3rd Generation Partnership Project, "3rd Generation Partnership Project; Technical Specification Group Radio Access Network; Evolved Universal Terrestrial Radio Access Network (E-UTRAN); M2 Application Protocol (M2AP) (Release 11)", Technical Specification, 3GPP TS 36.443 V11.3.0, Jun. 1, 2013, pp. 1-84, 3GPP, France.

3rd Generation Partnership Project, "3rd Generation Partnership Project; Technical Specification Group Core Network and Terminals; Interworking between the Public Land Mobile Network (PLMN) supporting packet based services and Packet Data Networks (PDN) (Release 12)", Technical Specification, 3GPP TS 29.061 V12.3.0, Sep. 1, 2013, pp. 1-164, 3GPP, France.

3rd Generation Partnership Project, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)", Technical Specification, 3GPP TS 29.274 V12.2.0, Sep. 1, 2013, pp. 1-230, 3GPP, France.

* cited by examiner

FEEDBACK BASED ADAPTATION OF MULTICAST TRANSMISSION OFFSET

TECHNICAL FIELD

The present invention relates to methods for managing multicast transmissions in a cellular network and to corresponding devices.

BACKGROUND

In cellular networks, e.g., as specified by 3GPP ($3^{rd}$ Generation Partnership Project), it is known to use broadcast or multicast transmission modes for efficiently conveying data, e.g., multimedia content such as mobile TV, to a plurality of users. For example, such multicast or broadcast transmission modes typically allow simultaneous reception of the data by a large number of users while avoiding excessive usage of radio resources because multiple users may receive the data from the same radio resources. An example of such broadcast or multicast transmission mode eMBMS (evolved Multimedia Broadcast Multicast Service) as specified in 3GPP TS 36.440 V11.2.0 (2013 March) for the LTE (Long Term Evolution) radio technology.

In eMBMS, a BM-SC (Broadcast Multicast Service Centre) provides multicast data to a plurality of LTE base stations, referred to as eNB (evolved Node B) and instructs the eNBs when to send the multicast data over the radio interface. In this way, the multicast data can be transmitted synchronously by the eNBs on a single frequency. The synchronization is achieved by utilizing a synchronization protocol as specified in 3GPP TS 25.446 V11.0.0 (2012 September). According to this synchronization protocol, the multicast data is transmitted in Sync PDUs (Packet Data Units) which include a relative timestamp indicating the starting time of sending the multicast data by the eNBs. The relative timestamp is calculated by the BM-SC as the time when the Sync PDU leaves the BM-SC plus an offset. The offset has the purpose of ensuring that the Sync PDUs reach the different eNBs before the intended starting time, irrespective of an inevitable delay incurred during transmission of the Sync PDU to each individual eNB.

The performance of eMBMS is sensitive to the setting of the offset. For example, if the offset is too short, there is a risk that the Sync PDU will not reach certain eNBs in time, i.e., sufficiently early before the intended starting time of sending the multicast data. Such eNBs may then not participate in the transmission of the multicast data in the Sync PDU and will typically drop the Sync PDU, preventing the users served by these eNBs from receiving the multicast data. On the other hand, if the offset is too long the eNBs typically need to buffer more Sync PDUs, which increases usage of memory resources at the eNBs. Still further, the offset also causes a delay in the delivery of the data to the users, which may be undesirable in view of user experience, e.g., in the case of a live broadcast of multimedia content. Accordingly, it may be difficult to find an appropriate setting for the offset. Moreover, such appropriate setting of the offset may even vary between different service areas within the cellular network, e.g., due to different delays associated with the connection between the BM-SC and the eNBs of the various service areas or due to different capabilities of the eNBs of the various service areas.

Accordingly, there is a need for techniques which allow for efficiently managing the transmission of multicast data in a cellular network.

SUMMARY

According to an embodiment of the invention, a method for managing multicast transmissions in a cellular network is provided. According to the method, a node of the cellular network node sends data units to a group of base stations. Each data unit is configured for conveying multicast data to be sent by the base stations in a synchronized manner at a starting time indicated in the data unit. For each of the data units, the node determines the starting time as the sum of the time of sending the data unit from the node and an offset value. Further, the node obtains feedback information from the base stations of the group. The feedback information indicates a deviation of the starting time indicated in one of the data units from an earliest possible time of sending the multicast data from the data unit by the base stations of the group. Depending on the feedback information, the node adapts the offset value.

According to a further embodiment of the invention, a node for a cellular network is provided. The node comprises an interface for communication with a group of base stations. Further, the node comprises at least one processor. The at least one processor is configured to send data units to the group of base stations. Each data unit is configured for conveying multicast data to be sent by the base stations in a synchronized manner at a starting time indicated in the data unit. Further, the at least one processor is configured to determine, for each of the data units, the starting time as the sum of the time of sending the data unit from the node and an offset value. Further, the at least one processor is configured to obtain feedback information from the base stations of the group. The feedback information indicates a deviation of the starting time indicated in one of the data units from an earliest possible time of sending the multicast data from the data unit by the base stations of the group. Further, the at least one processor is configured to adapt the offset value depending on the feedback information.

According to a further embodiment of the invention, a computer program or computer program product is provided, e.g., in the form of a non-transitory storage medium. The computer program or computer program product comprises program code to be executed by at least one processor of a node for a cellular network. Execution of the program code causes the at least one processor to send data units to a group of base stations. Each data unit is configured for conveying multicast data to be sent by the base stations in a synchronized manner at a starting time indicated in the data unit. Further, execution of the program code causes the at least one processor to determine, for each of the data units, the starting time as the sum of the time of sending the data unit from the node and an offset value. Further, execution of the program code causes the at least one processor to obtain feedback information from the base stations of the group. The feedback information indicates a deviation of the starting time indicated in one of the data units from an earliest possible time of sending the multicast data from the data unit by the base stations of the group. Further, execution of the program code causes the at least one processor to adapt the offset value depending on the feedback information.

DETAILED DESCRIPTION OF EMBODIMENTS

In the following, concepts according to embodiments of the invention will be explained in more detail by referring to the accompanying drawings. The illustrated concepts relate to management of multicast transmissions in a cellular network, in particular a cellular network which is based on the LTE radio technology. However, it is to be understood that the illustrated concepts could be applied in a corresponding manner to other radio technologies, e.g., GSM (Global System for Mobile communication), UMTS (Universal Terrestrial Mobile Telecommunications System) or Wideband CDMA (Code Division Multiple Access), or CDMA2000. As used herein, a "multicast" transmission is intended to refer to a transmission which is receivable by a plurality of recipients. A "broadcast" transmission is intended to refer to the more specific case of a transmission which is receivable by all suitable recipients in a given coverage area.

Figure 1:
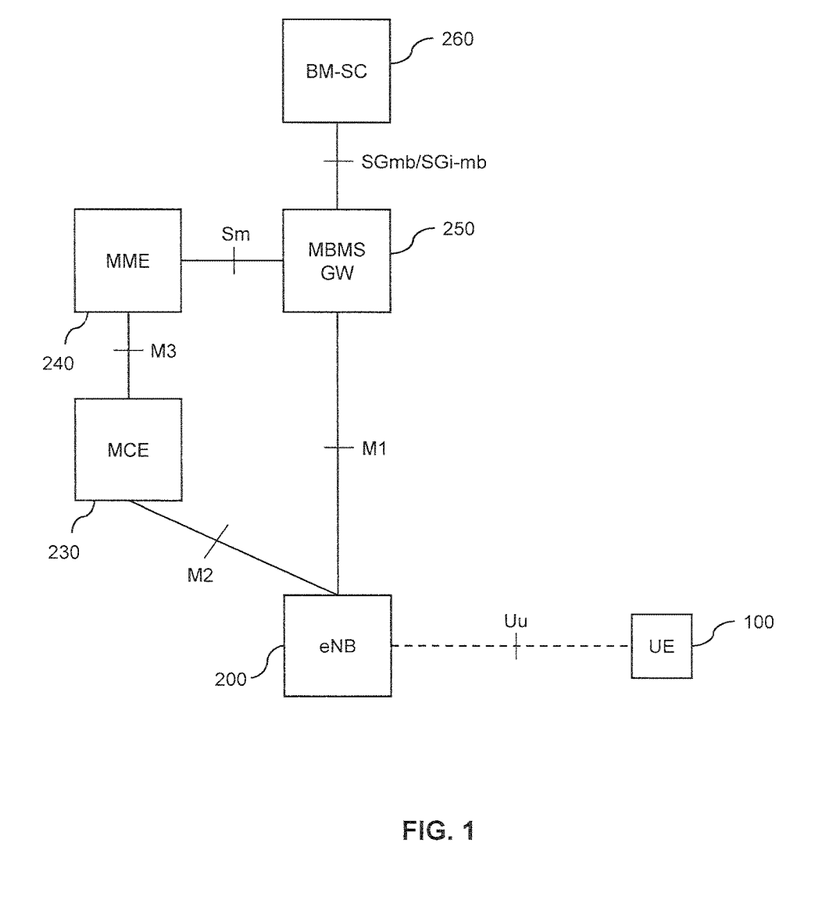
FIG. 1 schematically illustrates an a cellular network architecture for performing multicast transmissions in accordance with an embodiment of the invention.

An architecture as used for implementing the multicast transmissions in the cellular network is illustrated in FIG. 1. The architecture includes a base station 200, in accordance with the LTE terminology termed as eNB, a Multi-cell/Multicast Coordination Entity (MCE) 230, a Mobility Management Entity (MME) 240, an MBMS Gateway (MBMS GW) 250, and a BM-SC 260. Further, FIG. 1 also illustrates an exemplary user equipment (UE) 100 which may receive the multicast transmissions. For the sake of clarity, FIG. 1 illustrates only a single eNB 200 and a single UE 100. However, it is to be understood that in typical multicast transmission scenarios multiple eNBs 200 and UEs 100 would be involved.

The BM-SC 260 provides functions for MBMS user service provisioning and delivery. Typical funtionalities of the BM-SC 260 include a membership function, a session and transmission function, a proxy and transport function, a service announcement function and a security function. The BM-SC 260 functions are for example further specified in 3GPP TS 23.246 V11.1.0 (2012 March). Within the session and transmission function, the BM-SC 260 is responsible for providing the multicast data to be transmitted in a synchronized manner by eNBs, e.g., the eNB 200, in an MBMS Single Frequency Network (MBSFN) area. Functionalities of the MCE 230 include admission control and allocation of radio resources to be used by. The MCE 230 may also decide on a Modulation and Coding Scheme (MCS) to be used for the synchronized transmission. Functionalities of the MBMS GW 250 include distribution of the multicast data to the eNBs, e.g., to the eNB 200. Specifically, the MBMS GW 250 may use a unicast transmission mechanism, e.g., based on the Internet Protocol (IP), for receiving the multicast data from the BM-SC 260 and the distribute the multicast data to the eNBs using a multicast transmission mechanism, e.g., IP Multicast.

As further illustrated, the BM-SC 260 may be coupled to the MBMS GW 250 via a control plane interface referred to as "SGmb" and via a user plane interface referred to as "SGi-mb". Further, the MCE 230 may be coupled to the MME 240 via an interface termed as "M3", the MCE 230 may be coupled to the eNB 200 via an interface termed as "M2", and the MBMS GW 250 may be coupled to the eNB 200 via an interface termed as "M1". Further, the MBMS GW 250 may be coupled to the MME 240 via an interface termed as "Sm". As further illustrated, the eNB 200 is coupled to the UE 100 via a radio interface termed as "Uu". The eNB 200 receives control plane information from the MCE 230 via the M2 interface. Further, the MBMS GW 250 receives the multicast data from the BM-SC 260 via the SGi-mb user plane interface, and the eNB 200 receives the multicast data from the MBMS GW 230 via the M1 interface. The eNB then sends the multicast data via the Uu radio interface to the UE 100, which is accomplished in a synchronized manner jointly with the other eNBs of the MBSFN area. Further functionalities of the illustrated nodes and interfaces may correspond to those as defined in 3GPP TS 36.300 V11.7.0 (2013 September). Details of the M1 interface are for example specified in 3GPP TS 36.445 V11.0.0 (2012 September). Details of the M2 interface are for example specified in 3GPP TS 36.443 V11.3.0 (2013 June). Details of the M3 interface are for example specified in 3GPP TS 36.444 V11.6.0 (2013 June). The SGmb and SGi-mb interfaces are for example further specified in 3GPP TS 29.061 V12.3.0 (2013 September). The Sm interface is for example further specified in 3GPP TS 29.274 V12.2.0 (2013 September).

The synchronization of the transmission of the multicast data by the different eNBs is assumed to be based on indicating the intended starting time of the multicast data in a data unit which is used for conveying the multicast data to the eNBs. In particular, a synchronization protocol as defined in 3GPP TS 25.446 is assumed to be used for this purpose.

Figure 2:
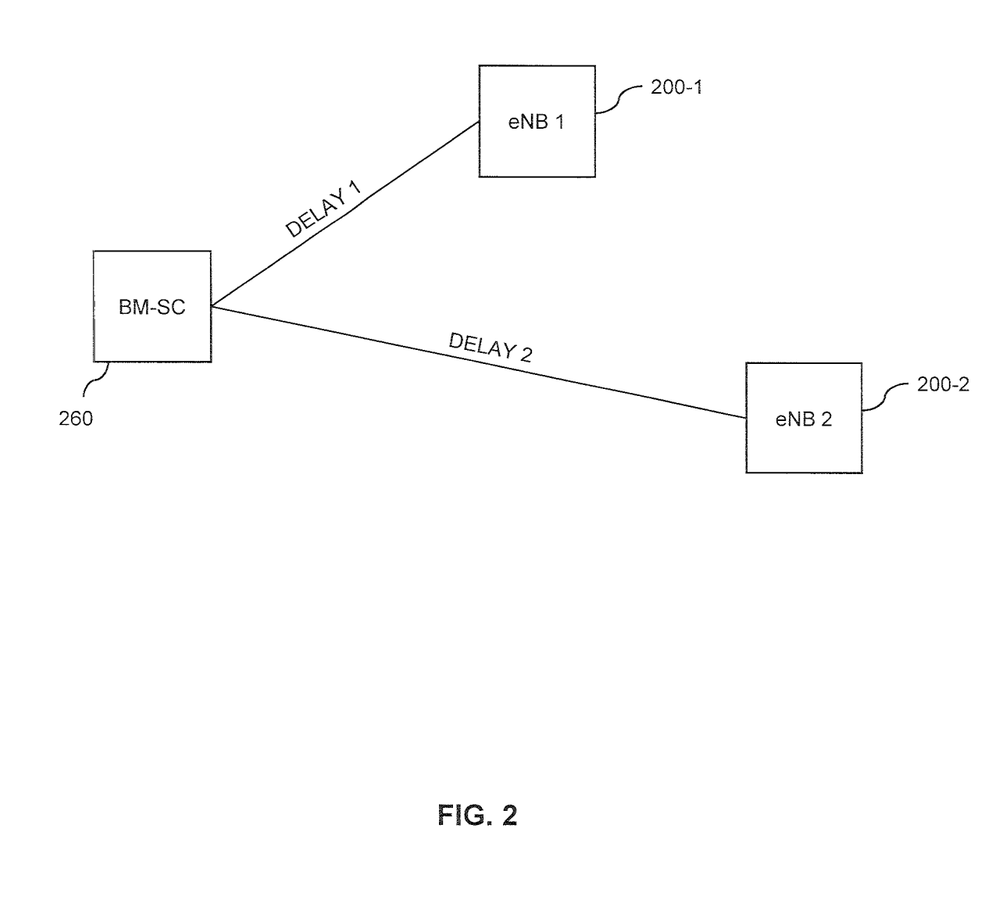
FIG. 2 illustrates an exemplary scenario of communication between a BM-SC and different eNBs which perform multicast transmission according to an embodiment of the invention.

Accordingly, in the illustrated concepts the BM-SC 260 determines, for each Sync PDU transmitted to the eNBs, a starting time at which the eNBs shall start sending the multicast data from the Sync PDU via the radio interface. As defined in 3GPP TS 25.446, the starting time may be indicated in the form of a relative timestamp. The BM-SC 260 determines the starting time as the time of sending the Sync PDU plus an offset value. The offset value allows for accommodating different delays associated with the transmission of the Sync PDU to one and another eNB in the MBSFN area. An exemplary scenario involving such different delay is illustrated by as illustrated in FIG. 2, in which a network path from the BM-SC 260 to a first eNB 200-1 is associated with a delay (Delay 1) which is shorter than the delay (Delay 2) associated with a network path from the BM-SC 260 to a second eNB 200-2. By selecting the offset value larger than the longer delay (Delay 2), it can be ensured that both eNBs 200-1, 200-2 receive the Sync PDU before the intended starting time. Here, it is to be understood that this control of the starting time for sending multicast data may also be applied in a multicast coverage area which includes multiple service areas or even multiple MBSFNs.

In the illustrated concepts, the BM-SC 260 adapts the offset value depending on feedback information from the eNBs 200-1, 200-2, thereby allowing for efficiently achieving an appropriate setting of the offset value. The feedback information indicates a deviation of the starting time indicated in a Sync PDU from an earliest possible time of sending multicast data in the Sync PDU via the radio interface. This will be now be further explained by referring to the timing diagram of FIG. 3, which is based on the exemplary scenario assumed FIG. 2.

Figure 3:
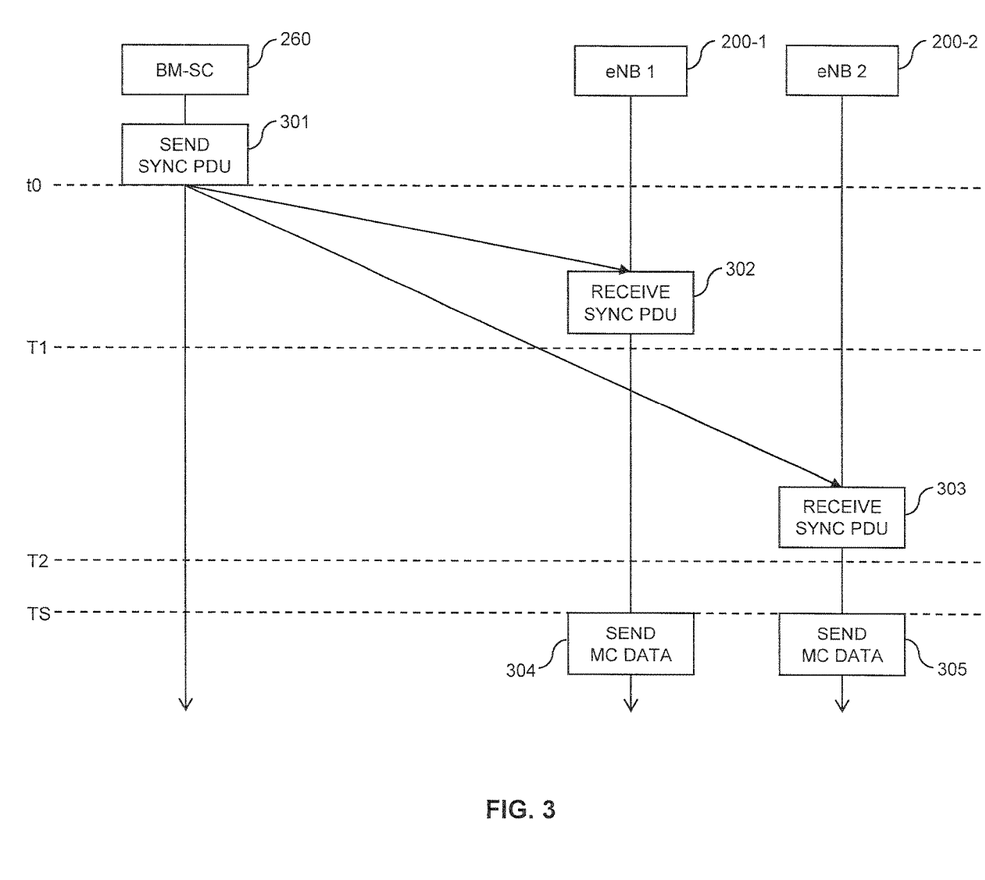
FIG. 3 shows a timing diagram of a multicast transmission in the scenario of FIG. 2.

FIG. 3 illustrates an exemplary multicast transmission process which is based on the scenario of FIG. 2.

At step 301, the BM-SC 260 sends a Sync PDU to the first eNB 200-1 and to the second eNB 200-2. This is accomplished at time t0. Due to the different delays associated with the network paths to the first eNB 200-1 and the second eNB 200-2, the first eNB 200-1 receives the Sync PDU earlier than the second eNB 200-2, as illustrated by steps 302 and 303. At the intended starting time, indicated by TS, the first eNB 200-1 and the second eNB 200-2 send the multicast data conveyed in the Sync PDU, as illustrated by steps 304 and 305. Accordingly, the transmission of the multicast data by the first eNB 200-1 and the second eNB 200-2 is synchronized.

However, the first eNB 200-1 could have sent the multicast data already at an earlier point of time, indicated by T1. Similarly the second eNB 200-2 could have sent the multicast data already at an earlier point of time, indicated by T2. Accordingly, in the assumed scenario the offset value used by the BM-SC 260 for determining the starting time TS (corresponding to TS−t0) is too long, resulting in unnecessary delay of the multicast transmission and possible degradation of user experience, and also in increased buffering load at the eNBs 200-1, 200-2.

In the illustrated concepts, the BM-SC 260 obtains feedback information from the eNBs 200-1, 200-2. The feedback information indicates a deviation of the earliest possible time T1, T2 of sending the multicast data by the eNBs 200-1, 200-2 from the starting time TS indicated in the Sync PDU. In the illustrated scenario, the feedback information can be obtained by causing each of the eNBs 200-1, 200-2 to measure the difference of the earliest possible time of sending the multicast data from the Sync PDU and the starting time TS indicated in the Sync PDU. That is to say, the first eNB 200-1 would measure the difference T1−TS, and the second eNB 200-2 would measure the difference T2−TS. In a generalized scenario involving N eNBs, identified by indices n=1, 2, . . . , N, the eNB with index n would measure the difference $$Cn=Tn-TS, \quad (1)$$

where Tn denotes the earliest possible time of sending the multicast data by the respective eNB.

The measured differences are then reported toward the BM-SC 260. The maximum value of the reported differences, may then be used for adapting the offset value OFF according to:

$$OFF=OFF+\max(Cn). \quad (2)$$

The maximum value max(Cn) may be evaluated by the BM-SC 260, using the values of Cn reported by the eNBs. However, as will be explained below, it is also possible that a part of this evaluation is accomplished by other nodes.

In some scenarios, also a minimum value of the reported differences Cn may be evaluated. This minimum value may for example be used for monitoring purposes. In particular, by monitoring a deviation of the maximum value of the reported differences Cn from the minimum value of the reported differences a sanity check may be performed. For example, if the deviation of the minimum value from the maximum value exceeds a threshold, this may be indicative of an error or a faulty configuration in the network infrastructure.

Figure 4:
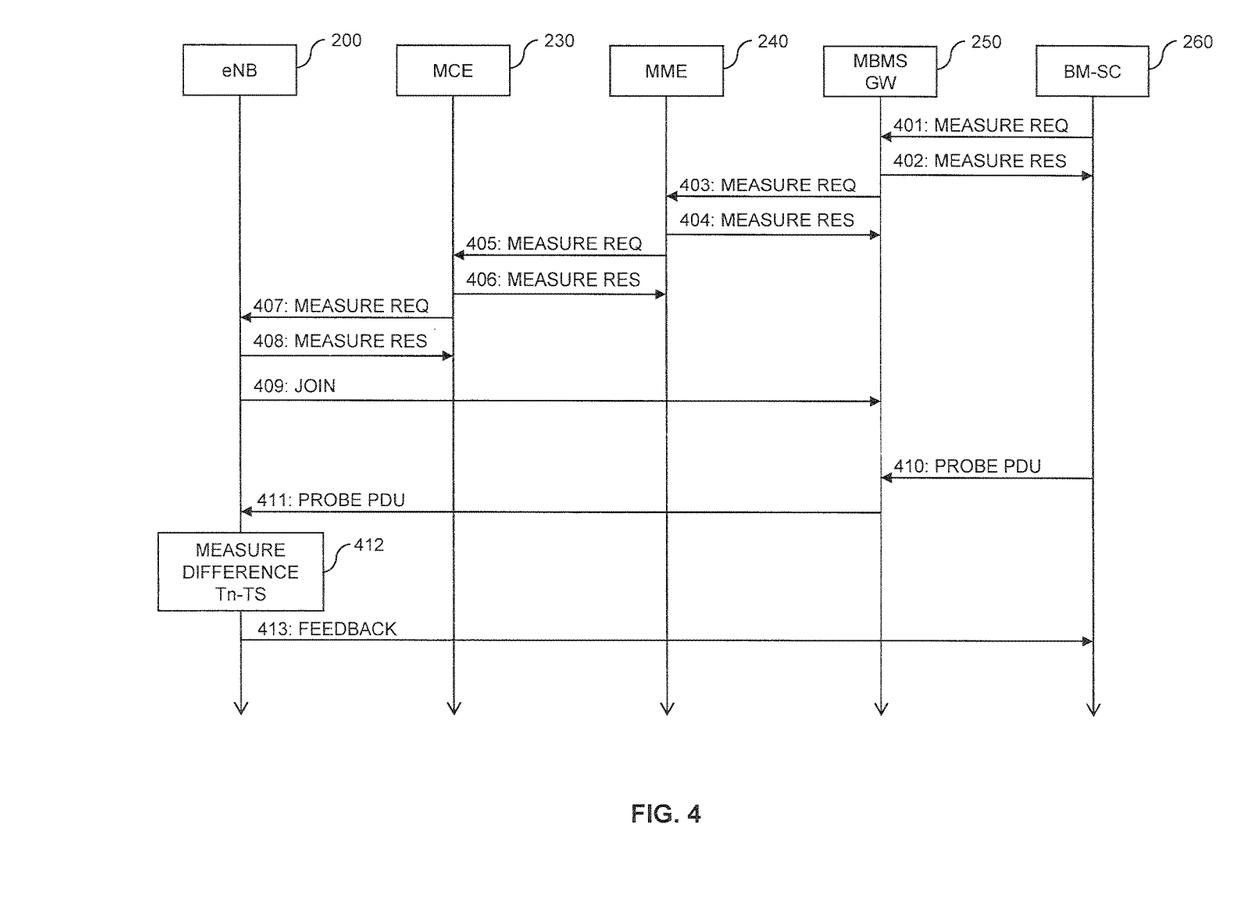
FIG. 4 shows timing diagram for illustrating an exemplary measurement procedure according to an embodiment of the invention.

FIG. 4 illustrates exemplary procedures which may be used for obtaining the feedback information in an architecture as illustrated in FIG. 1. The illustrated procedures involve the eNB 200, which represents one eNB from a group of eNBs, the MCE 230, the MME 240, the MBMS GW 250, and the BM-SC 260.

As illustrated, the procedure may be initiated by the BM-SC 260 by sending measurement request 401 to the MBMS GW 250. The measurement request 401 may be sent over the SGmb interface as illustrated in FIG. 1. The MBMS GW 250 may acknowledge the measurement request 401 by sending a measurement response 402 to the BM-SC 260. The BM-SC 260 may initiate the procedure in response to one or more triggering events. Examples of such triggering events are new formation of a group of eNBs covering a certain MBSFN area, adding an eNB to such group, or removing an eNB from such group. In some scenarios, the procedure may also be initiated by an eNB reporting excessive dropping of Sync PDUs, which may be an indication of a too short setting of the offset value. Similarly, the procedure may also be initiated by an eNB reporting excessive buffer usage for storing Sync PDUs, which may be an indication of a too long setting of the offset value. The measurement request 401 may for example indicate an originating IP address of the node which initiated the measurement procedure, e.g., of the BM-SC 260. Further, the measurement request 401 may include an indication of the eNBs intended to participate in the measurement, e.g., in terms of a list of Service Area Identifiers (SAIs) or in terms of an indication that all available eNBs shall participate in the measurement. Further, the measurement request may indicate the MMEs of the service areas intended to participate in the measurement, e.g., in terms of a list of MMEs. Still further, the measurement request 401 may indicate an IP address to which the measurements shall be reported. In the exemplary procedure of FIG. 4, the latter IP address is assumed to correspond to the IP address of the BM-SC 260. However, as will be further explained below, also other nodes may act as a feedback receiver. The measurement request 401 may also be combined with another message, e.g., the MBMS session start request as specified for the SGmb interface.

Having received the measurement request 401, the MBMS GW 250 sends a measurement request 403 to the MME 240. Here, it is to be understood that if the service areas of multiple MMEs are intended to participate in the measurement, as indicated in the measurement request 401, the MBMS GW 250 may send the measurement request 403 to each of these multiple MMEs. The measurement request 403 may be sent over the Sm interface as illustrated in FIG. 1. The MME 240 may acknowledge the measurement request 403 by sending a measurement response 404 to the MBMS GW 250. Similar to the measurement request 401, the measurement request 403 may indicate the originating IP address of the node which initiated the measurement procedure, e.g., of the BM-SC 260. Further, the measurement request 403 may include an indication of the eNBs intended to participate in the measurement, e.g., in terms of a list of Service Area Identifiers (SAIs) or in terms of an indication that all available eNBs shall participate in the measurement. Further, the measurement request 403 may indicate the IP address to which the measurements shall be reported. Still further, the measurement request 403 may indicate an IP Multicast address to be used for sending Sync PDUs by the MBMS GW 250. Moreover, the measurement request may also indicate a tunnel identifier for conveying the Sync PDUs using IP Multicast, e.g., a Common Tunnel Endpoint Identifier (C-TEID). The measurement request 403 may also be combined with another message, e.g., the MBMS session start request as specified for the Sm interface.

Having received the measurement request 403, the MME 240 sends a measurement request 405 to the MCE 230. Here, it is to be understood that the measurement request 405 is typically sent to multiple MCEs, which serve the eNBs indicated in the measurement request 403. The measurement request 405 may be sent over the M3 interface as illustrated in FIG. 1. The MCE 230 may acknowledge the measurement request 405 by sending a measurement response 406 to the MME 240. The measurement request 405 may indicate the originating IP address of the node which initiated the measurement procedure, e.g., of the BM-SC 260. Further, the measurement request 405 may include an indication of the eNBs intended to participate in the measurement, e.g., in terms of a list of Service Area Identifiers (SAIs) or in terms of an indication that all available eNBs shall participate in the measurement. Still further, the measurement request 405 may indicate the IP address to which the measurements shall be reported. The measurement request 405 may also be combined with another message, e.g., the MBMS session start request as specified for the M3 interface.

Having received the measurement request 405, the MCE 230 sends a measurement request 407 to the eNB 200. Also in this case, the measurement request 407 is typically sent to multiple eNBs, as indicated in the measurement request 405. The measurement request 407 may be sent over the M2 interface as illustrated in FIG. 1. The eNB 200 may acknowledge the measurement request 407 by sending a measurement response 408 to the MCE 230. The measurement request 407 may indicate the originating IP address of the node which initiated the measurement procedure, e.g., of the BM-SC 260. Further, the measurement request 407 may indicate the IP address to which the measurements shall be reported. The measurement request 407 may also be combined with another message, e.g., the MBMS session start request as specified for the M2 interface.

Having received the measurement request 407, the eNB 200 prepares to perform the requested measurement. For example, if the Sync PDUs are transmitted by IP Multicast from the MBMS GW 250 to the different eNBs of the group, this may involve that the eNB 200 joins the corresponding IP Multicast group by sending a join message 409 to the MBMS GW 250. Further, in some scenarios the measurement procedure may be performed using a dummy Sync PDU for which no multicast data need to be sent over the radio interface. In this case, the eNB 200 may prepare for receiving and sending multicast data in the same way as for usual Sync PDUs, however without reserving radio resources for the sending of the multicast data and actually sending any multicast data. Usage of such dummy Sync PDU for measurement purposes allows for using an aggressive initial offset value without the risk of loosing actual multicast payload. For example, an initial offset value of 0 ms could be used.

The BM-SC 260 then prepares a probe Sync PDU. The starting time TS indicated in the probe Sync PDU is determined by the BM-SC 260 using the current setting of the offset value for the group of eNBs. As mentioned above, the probe Sync PDU may be a dummy Sync PDU for which no multicast data need to be sent over the radio interface. The BM-SC 260 then sends the probe Sync PDU to the MBMS GW 250, as indicated by message 410. This may be accomplished via the SGi-mb user plane interface as illustrated in FIG. 1. The MBMS GW 250 forwards the Sync PDU to the eNB 200 and to the other eNBs of the group, as indicated by message 411. As mentioned above, the latter may be accomplished by using an IP Multicast transmission mechanism.

Having received the probe Sync PDU, the eNB 200 measures the difference of the earliest possible time of sending the multicast data from the probe Sync PDU via the radio interface and the starting time TS indicated in the probe Sync PDU, as indicated by step 412. For this purpose, the eNB 200 may calculate the difference according to relation (1). For determining the earliest possible time of sending the multicast data from the probe Sync PDU, the eNB 200 may consider a currently applicable granularity of multicast scheduling, e.g., as indicated by the MCE 230. For example, the eNB 200 may apply the usual scheduling process to schedule the multicast transmission immediately according to this granularity and then determine the scheduled time.

Having performed the measurement, the eNB 200 sends feedback information 413 indicating the measured difference to the reporting IP address indicated in the measurement request 407, which in the illustrated scenario corresponds to the IP address of the BM-SC 260. The feedback information 413 may also include further information, e.g., an identifier of the service area to which the reporting eNB 200 belongs. The latter may allow for evaluating the feedback information on a per service area basis. Accordingly, in the illustrated example each eNB of the group reports the measured difference to the BM-SC 260. The BM-SC 260 may then evaluate the maximum value from the reported differences and adapt the offset value depending on this maximum value, e.g., by applying relation (2). Further, the BM-SC 260 could also evaluate a minimum value from the reported differences and use this minimum value for monitoring purposes, e.g., by monitoring a deviation of the minimum value from the maximum value.

Figure 5:
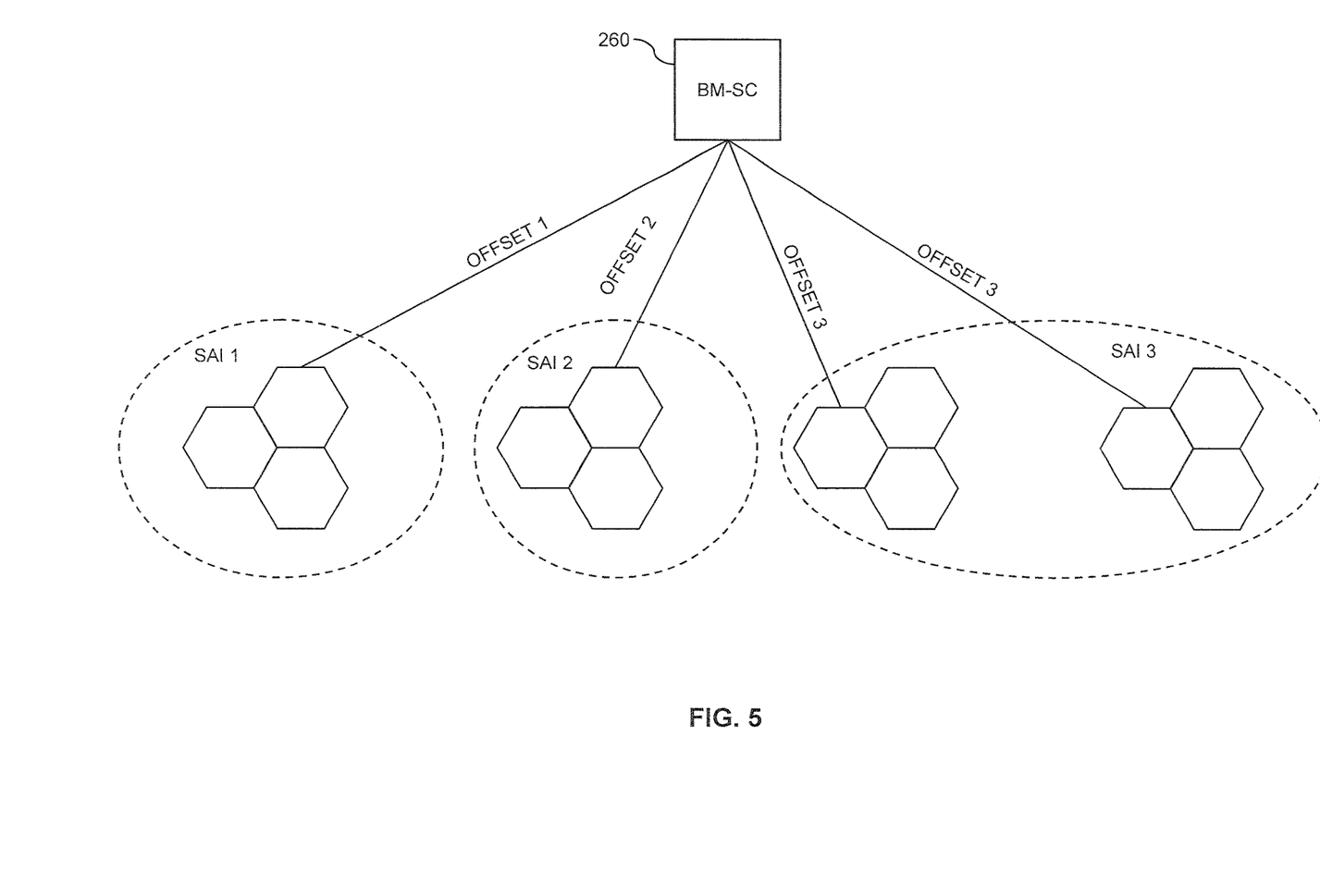
FIG. 5 schematically illustrates an exemplary scenario in which offset value adaptation according to an embodiment of the invention is applied with respect to multiple service areas.

As explained above, a procedure corresponding to that of FIG. 4 may be applied to a group of eNBs, e.g., the group of eNBs associated with an MBSFN area, and these eNBs may be located in different service areas of the cellular network. In some implementations, the group of eNBs could also be defined to correspond to a particular service area of the cellular network, and the procedure could be performed with respect to each service area, thereby obtaining an adapted offset value for each service area. A corresponding exemplary scenario is illustrated in FIG. 5. In the scenario of FIG. 5, a first adapted offset value (offset 1) is obtained for a first service area (identified by SAI 1), a second adapted offset value (offset 2) is obtained for a second service area (identified by SAI 2), and a third adapted offset value (offset 3) is obtained for a third service area (identified by SAI 3). In some implementations, such adapted offset values per service area may also be stored for later usage when an MBSFN area is formed from one or more of these service areas. For example, if in the exemplary scenario of FIG. 5 an MBSFN area is formed from the service areas SAI 1 and SAI 2, the BM-SC 260 could use the maximum value from the offset 1 (corresponding to the service area SAI 1) and the offset 2 (corresponding to the service area 2).

In some implementations, intermediate nodes may be involved in the reporting and/or evaluation of the feedback information from the eNBs. A corresponding exemplary scenario is illustrated in FIG. 6.

Figure 6:
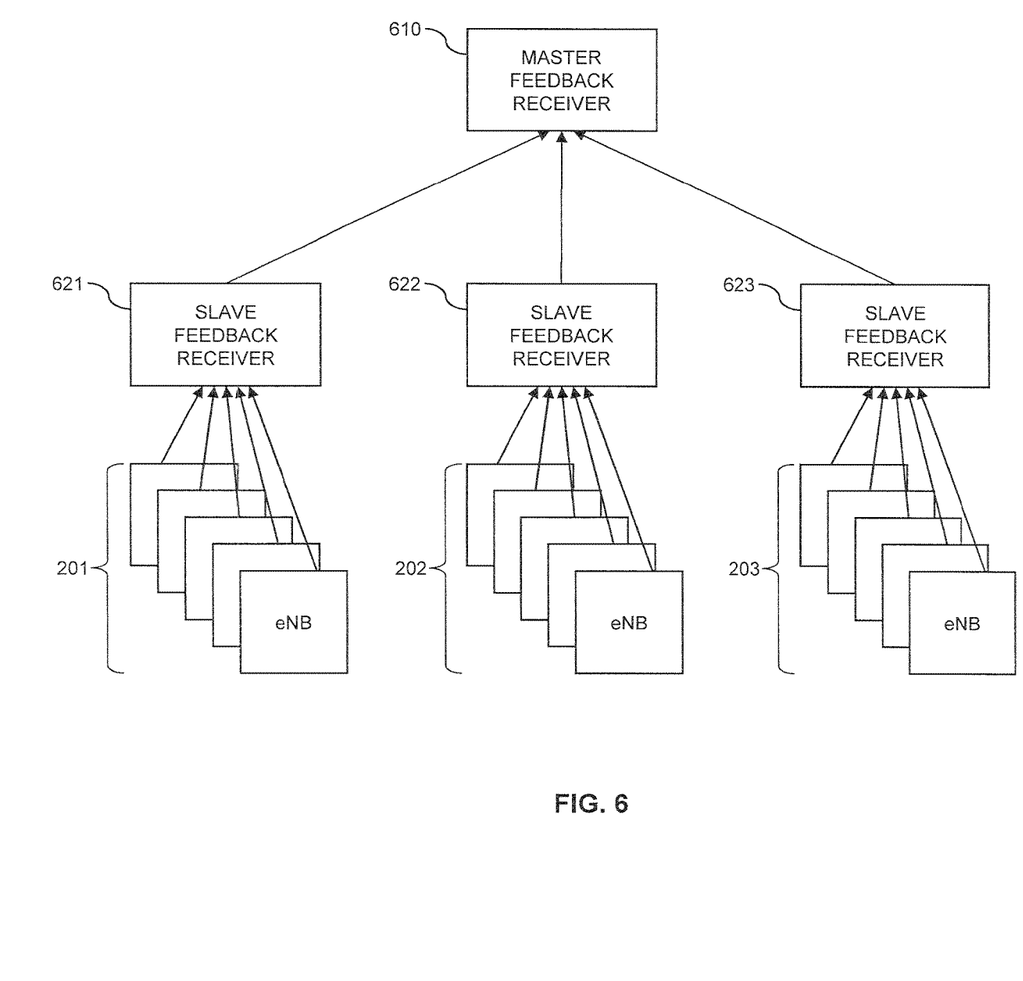
FIG. 6 schematically illustrates aggregation of feedback information according to an embodiment of the invention.

In the exemplary scenario of FIG. 6, the eNBs of a group for which adaptation of the offset value is performed is organized in multiple subgroups 201, 202, 203. Each of the subgroups 201, 202, 203 reports the feedback information, i.e., the difference Cn for each individual eNB of the subgroup, to a corresponding slave feedback receiver 621. In particular, the eNBs of the subgroup 201 report the feedback information to the slave feedback receiver 621, the eNBs of the subgroup 202 report the feedback information to the slave feedback receiver 622, and the eNBs of the subgroup 203 report the feedback information to the slave feedback receiver 623. The slave feedback receivers 621, 622, 623 aggregate the received feedback information and report the aggregated feedback information to a master feedback receiver 610. This aggregation performed by the slave feedback receivers 621, 622, 623 may also involve evaluation of the feedback information from the eNBs of the respective subgroup 201, 202, 203. In particular, the slave feedback receiver 621, 622, 623 may evaluate the maximum value from the differences Cn reported by the eNBs of the corresponding subgroup and report this maximum value in the aggregated feedback information to the master feedback receiver 610. The master feedback receiver 610 may then in turn evaluate the maximum value of the maximum values reported in the aggregated feedback information. Similarly, the slave feedback receiver 621, 622, 623 may also evaluate the minimum value from the differences Cn reported by the eNBs of the corresponding subgroup and report this minimum value in the aggregated feedback information to the master feedback receiver 610. The master feedback receiver 610 may then in turn evaluate the minimum value of the minimum values reported in the aggregated feedback information.

In some implementations, also a mixed reporting configuration may be used, in which for some of the eNBs the master feedback receiver 610 obtains the feedback information via slave feedback receivers as illustrated in FIG. 6, while for other eNBs the master feedback receiver obtains the feedback information from the eNBs, without intermediate slave feedback receivers or aggregation of feedback information. For example, in a corresponding modification of the exemplary scenario of FIG. 6, the eNBs of the subgroup 203 could report their feedback information directly to the master feedback receiver 610. The master feedback receiver 610 could treat these individually reporting eNBs in the same way as a subgroup and consider the reported difference Cn as a maximum value from a subgroup having only one member.

The functionalities of the slave feedback receivers and of the master feedback receiver may be allocated to the hierarchy of nodes in the architecture of FIG. 1. For example, the functionality of the slave feedback receiver could be allocated to different MCEs, and the functionality of the master feedback receiver could be allocated to the BM-SC 260. The handling of the reporting IP address in the procedure of FIG. 4 may be adapted accordingly. For example, the MCE 230 could replace the reporting IP address received in the measurement request 405 with its own IP address to receive the feedback information from the eNBs and could then report the aggregated feedback information to the reporting address as originally indicated in the measurement request 405.

Figure 7:
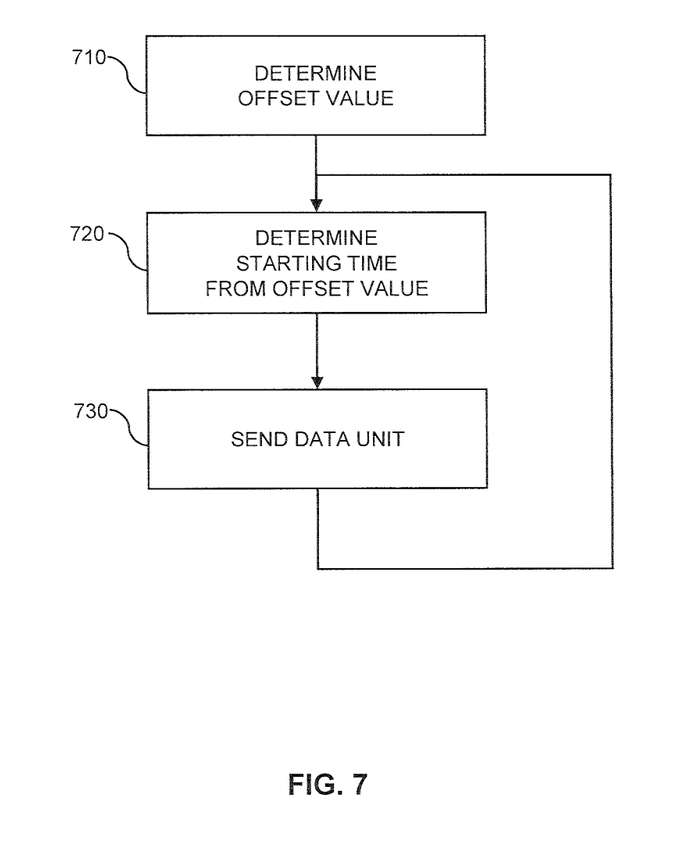
FIG. 7 shows a flowchart for illustrating a method of multicast transmission according to an embodiment of the invention.
Figure 8:
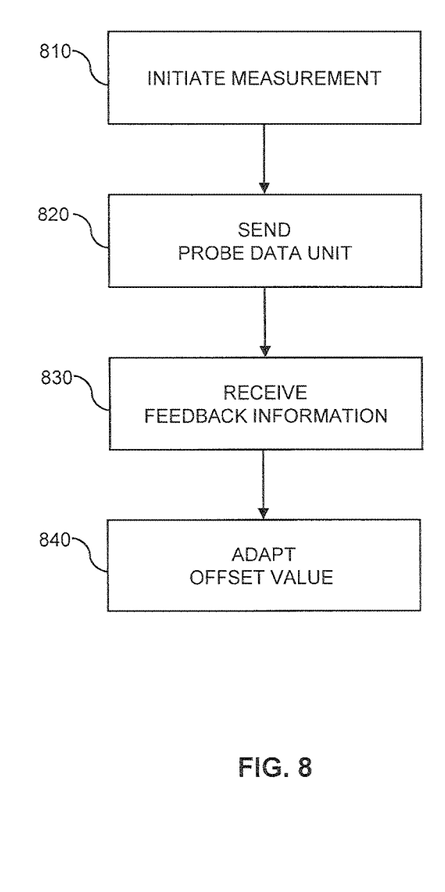
FIG. 8 shows a flowchart for illustrating a method of adapting an offset value as applied in the multicast transmission method of FIG. 7.

FIGS. 7 and 8 show a flowcharts for illustrating a method which may be used for implementing the above concepts in a node of a cellular network, e.g., in the above-mentioned BM-SC 260. If a processor based implementation of the node is used, the steps of the methods may be performed by one or more processors of the node. For this purpose, the processor(s) may execute correspondingly configured program code. Further, at least some of the corresponding functionalities may be hardwired in the processor(s).

At step 710, the node determines an offset value which is applicable for a group of base stations intended for transmitting multicast data, e.g., base stations of an MBSFN area or base stations of a particular service area, as explained above for the eNBs 200, 200-1, 200-2. This offset value may in particular be adapted by applying the method of FIG. 8, which will be further explained below.

At step 720, the node determines a starting time from the offset value. This is accomplished with respect to a particular data unit which is configured for conveying multicast data to be sent by the base stations in a synchronized manner, by sending the multicast data from the data unit at the starting time. The data unit may for example be a Sync PDU.

At step 730, the node sends the data unit to the base stations. The data unit indicates the starting time determined at step 720, at which the multicast data from the data unit are to be sent by the base stations to achieve synchronization.

Steps 720 and 730 may then be repeated for further data units configured for conveying multicast data to the base stations, e.g., further Sync PDUs.

For the adaptation of the offset value, the node obtains feedback information from the base stations of the group. The feedback information indicates a deviation of the starting time indicated in one of the data units from an earliest possible time of sending the multicast data from the data unit by the base stations of the group.

For obtaining the feedback information, the node may send a request toward the base stations of the group. For example, the node may initiate a measurement, as indicated by step 810 of FIG. 8, which may be accomplished by sending a measurement request. An example of such measurement request is the measurement request 401 of FIG. 4.

The node may initiate the obtaining of the feedback information in response to addition of a further base station to the group. Alternatively or in addition, the node may initiate the obtaining of the feedback information in response to removal of a base station from the group.

At step 820, the node sends a probe data unit to the base stations. Similar to the data units of FIG. 7, the probe data unit is configured for conveying multicast data to be sent by the base stations in a synchronized manner. For example, if the data units of FIG. 7 are Sync PDUs, also the probe data unit would be a Sync PDU. In some implementations, one of the data units of FIG. 7 could be used as the probe data unit. Alternatively, the probe data unit could be dedicated for measurement purposes, without carrying multicast data which actually need to be sent by the base stations of the group. In some implementations, the node may indicate to the base stations of the group that which data unit is utilized for probing. For example, in the measurement procedure of FIG. 4, the measurement request 401 and the subsequent measurement requests 403, 405, and 407 may be used to define an IP multicast group which is dedicated for sending the probe Sync PDU 411. The eNBs may therefore distinguish the probe Sync PDU 411 from other Sync PDUs and adapt their handling of the probe Sync PDU accordingly.

At step 830, the node receives the feedback information. This may be accomplished in feedback messages sent by the base stations, as explained for the feedback 413 of FIG. 4. Alternatively or in addition, this may be accomplished in feedback messages sent by one or more other nodes of the cellular network, which act as feedback receivers and aggregate the feedback information reported by the individual base stations, as explained for the exemplary scenario of FIG. 6.

The obtained feedback information may include, for at least one of the base stations, a value representing the time difference between the earliest possible time of sending the multicast data from the probe data unit by the base station and the starting time indicated in the probe data unit, e.g., the difference $C_n$ as calculated according to relation (1). Alternatively or in addition, the obtained feedback information may include, for at least one subgroup of the base stations, a value representing a maximum value of, for each base station of the subgroup, the time difference between the earliest possible time of sending the multicast data from the probe data unit by the base station and the starting time indicated in the probe data unit. Accordingly, the feedback information may include, for the at least one subgroup, the maximum value of $C_n$ for the base stations of the subgroup. A corresponding type of aggregated feedback information is explained above in connection with the exemplary scenario of FIG. 6.

At step 840, the node adapts the offset value. This is accomplished depending on the obtained feedback information. As mentioned above, the obtained feedback information may include, for multiple base stations of the group, corresponding values representing the time difference between the earliest possible time of sending the multicast data from the probe data unit by the respective base station and the starting time indicated in the probe data unit. That is to say, the values may represent the time difference individually for one each of these multiple base stations. The node may then determine a maximum value from these multiple values and adapting the offset value depending on the maximum value, e.g., using relation (2). As further mentioned above, the obtained feedback information may include multiple values which each apply for corresponding subgroups of the base stations and represent a maximum value of, for each base station of the subgroup, the time difference between the earliest possible time of sending the multicast data from the probe data unit by the base station and the starting time indicated in the probe data unit. The node may then determine a maximum value from these multiple values associated with different subgroups and adapt the offset value depending on this maximum value, e.g., using relation (2). In some implementations, the maximum value depending on which the offset value is adapted may also be determined from one or more of the above-mentioned values associated with an individual base station and one or more of the above-mentioned values associated with a subgroup base stations.

In some implementations, the node may also evaluate a minimum value from the above-mentioned values associated with individual base stations of the group and/or with subgroups of the base stations of the group. This minimum value may then be used for monitoring purposes. For example, the node may monitor a deviation of the minimum value from the maximum value determined at step 840. This monitoring may for example be used for detecting errors or a faulty configuration in the network infrastructure.

Figure 9:
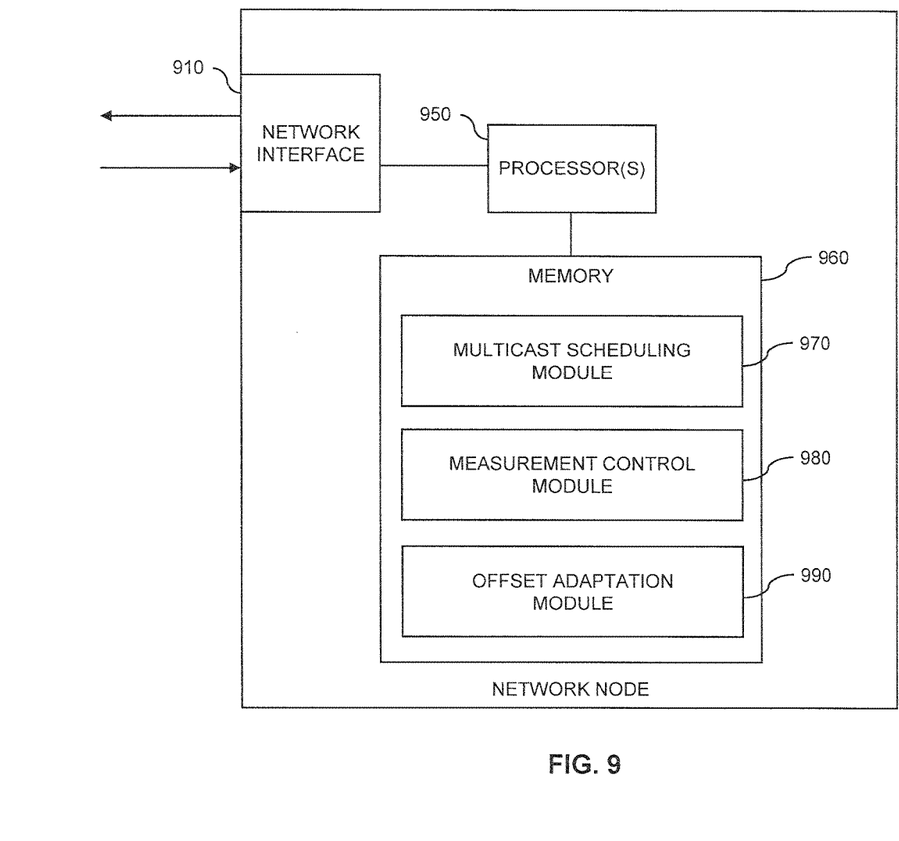
FIG. 9 schematically illustrates structures of a network node according to an embodiment of the invention.

FIG. 9 illustrates an exemplary implementation of a node which may be used to implement the above concepts. For example, the illustrated structures may be used to implement the above-described functionalities of the BM-SC 260.

In the illustrated example, the node includes a network interface 910, which may be used for communication with one or more further nodes of the cellular network, in particular base stations of the cellular network, such as the above-mentioned eNBs. This may be accomplished via further nodes of the cellular network, such as the above-mentioned MBMS GW 250, the MME 240, and/or the MCE 230. In an architecture as illustrated in FIG. 1, the network interface 910 may for example implement the SGmb and SGi-mb interfaces.

Further, the node includes one or more processor(s) 950 coupled to the interfaces 910 and a memory 960 coupled to the processor(s) 950. The memory 960 may include a read-only memory (ROM), e.g., a flash ROM, a RAM, e.g., a dynamic RAM (DRAM) or static RAM (SRAM), a mass storage, e.g., a hard disk or solid state disk, or the like. The memory 960 includes suitably configured program code modules to be executed by the processor(s) 950 so as to implement the above-described functionalities of the BM-SC 260, as for example explained in connection with the methods of FIGS. 7 and 8. More specifically, the program code modules in the memory 960 may include a multicast scheduling module 970 so as to implement the above-described functionalities of preparing multicast data to be sent by a group of base stations and determining the starting time of sending the multicast data by the group of base stations. Further, the program code modules in the memory 960 may include a measurement control module 980 so as to implement the above-mentioned functionalities the above-described functionalities for obtaining feedback information, e.g., by initiating a measurement procedure as described in connection with FIG. 4. Still further, the memory 960 may include an offset adaptation module 990 so as to implement the above-described functionalities of adapting the offset value depending on the obtained feedback information.

It is to be understood that the structure as illustrated in FIG. 9 is merely schematic and that the node may actually include further components which, for the sake of clarity, have not been illustrated, e.g., further interfaces or further processors. For example, the node could include an interface for receiving the multicast data from a content provider. Also, it is to be understood that the memory 960 may include further types of program code modules, which have not been illustrated, e.g., program code modules for implementing known functionalities of a BM-SC. In some implementations, also a computer program may be provided for implementing functionalities of the node, e.g., in the form of a physical medium storing the program code modules to be stored in the memory 960 or by making such program code available for download.

As can be seen, the concepts as described above may be used for efficiently managing multicast transmissions in a cellular network. Specifically, an offset value as used for determining the starting time of synchronized sending multicast data by multiple base stations may be optimized. In this way, unnecessary delays in the sending of the multicast data may be avoided and user experience improved. Further, discarding of multicast data can be avoided by setting the starting time sufficiently late to ensure that typically all base stations of the group have received the multicast data before the intended starting time.

It is to be understood that the examples and embodiments as explained above are merely illustrative and susceptible to various modifications. For example, rather than using a measurement procedure initiated by the BM-SC, the eNBs could continuously observe the difference between the earliest possible time of sending the multicast data from a Sync PDU and the starting time indicated in the Sync PDU, using at least some of the Sync PDUs of a usual MBMS session. In response to a request from the BM-SC or some other node, the eNBs could then provide the feedback information. Further, the reporting of the feedback information could also be triggered locally at an eNB, e.g., in response to the number of discarded Sync PDUs exceeding a threshold, which may occur if the currently applied offset value is too small or too long. Further, also the measurement of the difference between the earliest possible time of sending the multicast data from a Sync PDU and the starting time indicated in the Sync PDU could be triggered locally at an eNB, e.g., in response to the number of discarded Sync PDUs exceeding a threshold.

Further, the illustrated concepts could be used in connection with various types of cellular networks, without limitation to the LTE radio technology used in the above-described exemplary implementations. Moreover, it is to be understood that the above concepts may be implemented by using correspondingly designed software to be executed by one or more processors of an existing device, or by using dedicated device hardware. Also, the network anomaly analyzer as described herein may be implemented by a single device or by multiple devices, e.g., a device cloud or system of cooperating devices.

The invention claimed is:

1. A method for managing multicast transmissions in a cellular network, the method comprising:
   a node of the cellular network sending data units to a group of base stations, each data unit configured for conveying multicast data to be sent by the base stations in a synchronized manner at a starting time indicated in the data unit;
   the node determining, for each of the data units, the starting time as the sum of the time of sending the data unit from the node and an offset value;
   the node obtaining feedback information from the base stations of the group, the feedback information indicating a deviation of the starting time indicated in one of the data units from an earliest possible time of sending the multicast data from the data unit by the base stations of the group; and
   depending on the feedback information, the node adapting the offset value.

2. The method of claim 1, wherein the feedback information comprises, for at least one of the base stations, a value representing the time difference between the earliest possible time of sending the multicast data from the one of the data units by the base station and the starting time indicated in the one of the data units.

3. The method of claim 2, further comprising:
   the node obtaining the value for each of a plurality of the base stations;
   the node determining a maximum value from the plurality; and
   the node adapting the offset value depending on the maximum value.

4. The method of claim 3, further comprising:
   the node determining a minimum value from the plurality; and
   the node monitoring a deviation of the minimum value from the maximum value.

5. The method of claim 1, wherein the feedback information comprises, for at least one subgroup of the base stations, a value representing a maximum value of, for each base station of the subgroup, the time difference between the earliest possible time of sending the multicast data from the one of the data units by the base station and the starting time indicated in the one of the data units.

6. The method of claim 5, further comprising:
   the node obtaining the value for each of a plurality of the subgroups;
   the node determining a maximum value from the plurality; and
   the node adapting the offset value depending on the maximum value.

7. The method of claim 6:
   wherein the feedback information comprises, for each of the subgroups, a further value representing a minimum value of, for each base station of the subgroup, the time difference between the earliest possible time of sending the multicast data from the one of the data units by the base station and the starting time indicated in the one of the data units;
   further comprising the node:
      determining a minimum value from the further values; and
      monitoring a deviation of the minimum value from the maximum value.

8. The method of claim 1, further comprising the node initiating the obtaining of the feedback information in response to addition of a further base station to the group.

9. The method of claim 1, further comprising the node initiating the obtaining of the feedback information in response to removal of a base station from the group.

10. The method of claim 1, further comprising the node initiating the obtaining of the feedback information by sending a request toward the base stations of the group.

11. The method claim 1, further comprising the node indicating, to the base stations of the group, that the one of the data units is utilized for probing.

12. A node for a cellular network, the node comprising:
    an interface for communication with a group of base stations; and
    at least one processor;
    memory containing instructions executable by the at least one processor whereby the node is configured to:
       send data units to the group of base stations, each data unit being configured for conveying multicast data to be sent by the base stations in a synchronized manner at a starting time indicated in the data unit;
       determine, for each of the data units, the starting time as the sum of the time of sending the data unit from the node and an offset value;
       obtain feedback information from the base stations of the group, the feedback information indicating a deviation of the starting time indicated in one of the data units from an earliest possible time of sending the multicast data from the data unit by the base stations of the group; and
       depending on the feedback information, adapt the offset value.

13. The node of claim 12, wherein the feedback information comprises, for at least one of the base stations, a value representing the time difference between the earliest possible time of sending the multicast data from the one of the data units by the base station and the starting time indicated in the one of the data units.

14. The node of claim 13, wherein the instructions are such that the node is configured to:
obtain the value for each of a plurality of the base stations;
determine a maximum value from the plurality; and
adapt the offset value depending on the maximum value.

15. The node of claim 14, wherein the instructions are such that the node is configured to:
determine a minimum value from the plurality; and
monitor a deviation of the minimum value from the maximum value.

16. The node of claim 12, wherein the feedback information comprises, for at least one subgroup of the base stations, a value representing a maximum value of, for each base station of the subgroup, the time difference between the earliest possible time of sending the multicast data from the one of the data units by the base station and the starting time indicated in the one of the data units.

17. The node of claim 16, wherein the instructions are such that the node is configured to:
obtain the value for each of a plurality of the subgroups;
determine a maximum value from the plurality; and
adapt the offset value depending on the maximum value.

18. The node of claim 16:
wherein the feedback information comprises, for each of the subgroups, a further value representing a minimum value of, for each base station of the subgroup, the time difference between the earliest possible time of sending the multicast data from the one of the data units by the base station and the starting time indicated in the one of the data units;
wherein the instructions are such that the node is configured to:
determine a minimum value from the further values; and
monitor a deviation of the minimum value from the maximum value.

19. The node of claim 12, wherein the instructions are such that the node is configured to initiate the obtaining of the feedback information in response to addition of a further base station to the group.

20. The node of claim 12, wherein the instructions are such that the node is configured to initiate the obtaining of the feedback information in response to removal of a base station from the group.

21. The node of claim 12, wherein the instructions are such that the node is configured to initiate the obtaining of the feedback information by sending a request toward the base stations of the group.

22. The node of claim 12, wherein the instructions are such that the node is configured to indicate to the base stations of the group that the one of the data units is utilized for probing.

23. A computer program product stored in a non-transitory computer readable medium for managing multicast transmissions in a cellular network, the computer program product comprising software instructions which, when run on one or more processors of a node of the cellular network, causes the node to:
send data units to a group of base stations, each data unit configured for conveying multicast data to be sent by the base stations in a synchronized manner at a starting time indicated in the data unit;
determine, for each of the data units, the starting time as the sum of the time of sending the data unit from the node and an offset value;
obtain feedback information from the base stations of the group, the feedback information indicating a deviation of the starting time indicated in one of the data units from an earliest possible time of sending the multicast data from the data unit by the base stations of the group; and
depending on the feedback information, adapt the offset value.

* * * * *